United States Patent [19]

Bulang

[11] 4,185,969
[45] Jan. 29, 1980

[54] PROCESS AND PLANT FOR RECOVERING WATER FROM MOIST GAS

[75] Inventor: Wolfgang Bulang, Eichenau, Fed. Rep. of Germany

[73] Assignee: Maschinenfabrik Augsburg-Nuernberg AG, Munich, Fed. Rep. of Germany

[21] Appl. No.: 937,523

[22] Filed: Aug. 28, 1978

[30] Foreign Application Priority Data

Sep. 28, 1977 [DE] Fed. Rep. of Germany ....... 2738874

[51] Int. Cl.² .............................................. B01D 53/04
[52] U.S. Cl. ........................................... 55/31; 55/33; 55/74; 55/208; 55/387
[58] Field of Search ..................................... 34/79–81, 34/DIG. 1; 55/31, 33, 34, 35, 74, 75, 208, 387, 389; 62/94, 271; 202/234; 203/10, 11, DIG. 1

[56] References Cited

U.S. PATENT DOCUMENTS

| | | | |
|---|---|---|---|
| 1,863,578 | 6/1932 | Morse et al. | 55/35 |
| 2,138,687 | 11/1938 | Kirch | 55/74 X |
| 2,138,690 | 11/1938 | Kirch | 55/33 X |
| 2,138,691 | 11/1938 | Kirch | 55/34 X |
| 3,866,428 | 2/1975 | Simonet et al. | 55/75 X |
| 4,005,017 | 1/1977 | Kusano et al. | 55/387 X |

FOREIGN PATENT DOCUMENTS

| | | |
|---|---|---|
| 519618 | 3/1931 | Fed. Rep. of Germany . |
| 628095 | 3/1936 | Fed. Rep. of Germany . |
| 663920 | 2/1939 | Fed. Rep. of Germany . |
| 731471 | 2/1943 | Fed. Rep. of Germany . |
| 2516223 | 10/1976 | Fed. Rep. of Germany ............ 55/74 |
| 2321016 | 3/1977 | France . |
| 409369 | 4/1934 | United Kingdom .................. 55/33 |
| 432394 | 7/1935 | United Kingdom .................. 55/33 |
| 953185 | 3/1964 | United Kingdom .................. 55/74 |

*Primary Examiner*—Robert H. Spitzer
*Attorney, Agent, or Firm*—Schwartz, Jeffery, Schwaab, Mack, Blumenthal & Koch

[57] ABSTRACT

A process and an apparatus for recovering water from moist gas, e.g., humid air, are disclosed. The apparatus comprises fans, solar energy collectors, moisture absorber beds, and heat-accumulators which are connected by conduit means in such a manner that in a first reaction stage, e.g., at night time, moist gas, e.g., humid air, is sucked into the apparatus, is divided into two partial flows, the first of which is passed through the absorber beds in parallel or in series, whereby water is absorbed in the absorber beds, and then discharged and the second of which is passed through the heat-accumulators in series and then discharged, and that in a second reaction stage, e.g., during the daytime, a flow of gas is, preferably repeatedly, circulated in series from the fan through the solar energy collectors and absorber beds which are connected in alternating sequence and then through the heat-accumulators in series and back to the fan, whereby water is re-desorbed from the absorber beds and condensed on the surfaces of the heat-accumulators.

9 Claims, 2 Drawing Figures

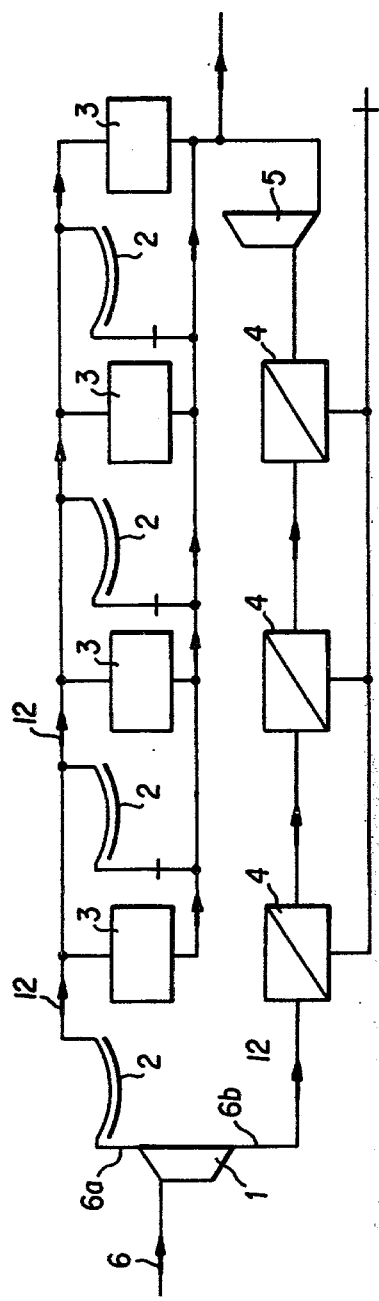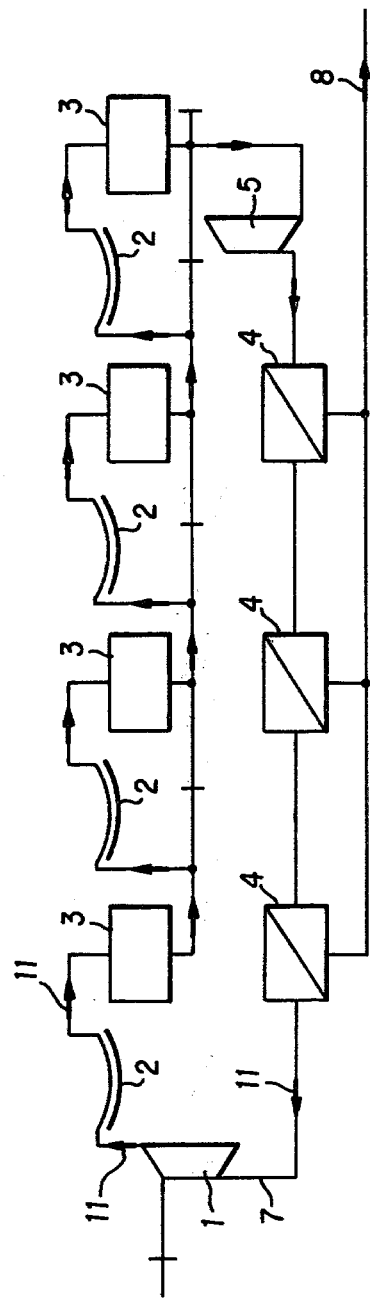

PROCESS AND PLANT FOR RECOVERING WATER FROM MOIST GAS

BACKGROUND OF THE INVENTION

The present invention pertains to a process for recovering water from moist gas, e.g., moist atmospheric air by utilizing solar energy, an absorbing agent and a heat-accumulator which comprises conducting two air flows of differential temperature alternately through the water-absorbing agent and passing same through the heat-accumulator. The invention also pertains to a plant for carrying out the process.

Processes for drying air and other moist gases are known in the art. In these prior art processes, water vapor is condensed by refrigerators or absorbed by absorbing agents such as molecular sieves, activated carbon or silical gel.

Recently a process and a plant have been proposed for recovering water from moist air, wherein the moisture content in the air, which is cooled overnight, is absorbed by an absorbing agent, in particular silica gel of a special kind, while a heat-accumulator in the form of a layer of stones is cooled down simultaneously. During the day the silica gel is regenerated by the now warm air whereby the relative humidity of the air is increased to such an extent that when the air passes through the cold layer of stones, water is condensed on the surface of the stones. The condensed water flows in the form of drops or a film into the trough.

The above process is suited for being carried out especially at those places where the relative humidity is high and large differences in temperature occur.

SUMMARY OF THE INVENTION

It is an object of the present invention to provide a process for recovering water from moist gas, in particular humid air, by which the recovery of water is also possible at places at which no large differences in temperature of the air occur, in particular places where during several months of the year the night temperature does not fall below 20°–30° C.

It is a further object of the present invention to provide a plant for carrying out such a process.

In order to accomplish the foregoing objects according to the present invention there is provided a process for recovering water from moist gas, in particular humid atmospheric air, which comprises a first reaction stage, which preferably takes place during the night and which comprises the steps of:

(a) dividing a first flow of the moist gas into a first partial flow of gas and a second partial flow of gas;
(b) passing the first partial flow of gas through at least one absorber bed of a water-separating plant containing an absorbing agent, whereby moisture from the moist gas is absorbed by the absorbing agent and a moisture-containing absorber bed and an at least partially dried first partial flow of gas are obtained;
(c) discharging the at least partially dried first partial flow of gas from the water-separating plant;
(d) passing the second partial flow of gas through at least one heat-accumulator of the water-separating plant, whereby heat is transferred from the heat-accumulator to the second partial gas flow and a de-heated accumulator and a heated second partial gas flow are obtained; and
(e) discharging the heated second partial gas flow from the water-separating plant;

and a second reaction stage, which preferably takes place during the daytime and which comprises the steps of:

(a') passing a second flow of the moist gas, preferably having a temperature slightly above that of the first flow of moist gas, through at least one unit of the water-separating plant comprising a solar energy collector and the moisture-containing absorber bed, whereby the second gas flow is heated by heat transfer from the solar energy collector to obtain a heated second gas flow and subsequently moisture is desorbed from the moisture-containing absorber bed and a heated second gas flow of increased moisture-content is obtained;
(b') subsequently passing the heated moisture-containing second gas flow through the deheated heat-accumulator, whereby heat is transferred to the heat-accumulator, and water is condensed on the accumulator surfaces and a second gas flow of decreased moisture-content and decreased temperature is obtained;
(c') discharging the second gas flow obtained in step (b') from the water-separating plant; and
(d') collecting the condensed water from the accumulator surfaces.

According to the present invention there is further provided a plant for carrying out the above-described process.

Further objects, features, and advantages of the invention will become apparent from the detailed description of the invention and its preferred embodiments which follows, and when considered together with accompanying figures of drawings.

BRIEF DESCRIPTION OF THE DRAWINGS

FIG. 1 is a schematic view of the plant according to the present invention during the phase of absorption;

FIG. 2 is a schematic view of the plant according to the present invention during the phase desorption.

DETAILED DESCRIPTION OF THE INVENTION AND ITS PREFERRED EMBODIMENTS

The problem underlying the invention is solved in the following manner: During a phase of absorption the first water-vapor-containing air flow of lower temperature is divided into two partial flows. The first partial flow passes through and washes the water-absorbing agent whereby water vapor is extracted from the air flow and is absorbed by the water-absorbing agent; and the second partial flow is passed through the heat-accumulator, thereby extracting heat from the latter. The heat-accumulator has received this heat from the second air flow and the condensing water-vapor. During a phase of desorption, the second air flow is heated by means of a solar energy collector up to the higher temperature, and the heated second air flow is passed through and washes the water-absorbing agent, whereby the second air flow increases its water-vapor-content by absorption of water present in the water-absorbing agent. The second air flow is passed through the heat-accumulator, from which heat has been extracted previously by the second partial flow of the first air flow, whereby water-vapor contained in the second air flow condenses on the heat-exchanging surfaces of the heat-accumulator. Hereby heat is again supplied to the heat-accumulator and the second air flow is cooled. The water condensed on the heat-exchanging surfaces of the heat-accumulator is collected. Subsequent to passing through the heat-accumulator, the second air flow is reheated by the solar energy collector, is passed through and washes the water-absorbing agent and passes through the heat-accumulator.

As a water-absorbing agent, any commercially available absorbing agents may be used. For example, suitable absorbing agents are molecular sieves, activated carbon, or silica gel.

It is a further feature of the invention that the first air flow is drawn from a cooled gas, e.g., the cool night air, that the moistening of the water-absorbing agent with the water-vapor contained in the first partial flow of the first air flow and the extraction of heat from the heat-accumulator by the other partial flow of the first air flow take place during a period of cool temperature, e.g., during the night-time, and that the absorption of water-vapor absorbed by the water-absorbing agent by the second air flow and the condensation of the water-vapor contained in the second air flow on the heat-accumulator take place during a period of warmer temperature, e.g., the day-time.

The moistening of the absorbing agent and the extraction of heat from the heat-accumulator during the night is advantageous because the temperature of the air decreased enormously at night and the relative humidity is correspondingly high.

According to the present invention there is also provided a plant for carrying out the process. This plant comprises a gas inlet, at least one fan, at least one solar energy collector, at least one absorber bed adapted to receive a water-absorbing agent, at least one heat accumulator, a gas outlet, and conduit means connecting the gas inlet, the fan, the solar energy collector, the absorber bed, the gas outlet, and the heat-accumulator in such a manner that during a first reaction stage the flow entering through the gas inlet is passed through the fan, divided into a first and second partial gas flow, the first partial gas flow is conducted through the absorber bed to the first gas outlet and the second partial gas flow is conducted through the heat-accumulator to the first gas outlet and in a second reaction stage a gas flow is passed from the gas inlet through the fan, then is circulated in series through the solar energy collector, the absorber bed, and the heat accumulator back to the fan.

Preferably the plant comprises at least two said solar energy collectors and at least two said absorber beds which are connected by said conduit means in such a manner that in the first reaction stage the first partial gas flow is passed through the absorber beds in series or parallel and in the second reaction stage the gas flow is passed through the solar energy collectors and the absorber beds in series alternatingly passing through one of the solar energy collectors and then one of the absorber beds.

Preferably the plant also comprises at least two heat-accumulators which are connected by said conduit means in such a manner that in the first and in the second reaction stage the gas flow is passed through the heat-accumulators in series.

According to an especially advantageous embodiment of the present invention, the plant comprises additional absorber beds and additional solar energy collectors which are positioned behind the first solar energy collector and several heat-accumulators connected to each other in series are provided, whereby the additional absorber beds can be connected by means of said conduit means alternatingly in series with the additional solar energy collectors during the phase of desorption and wherein the absorber beds can be connected in parallel or in series during the phase of adsorption.

Preferably the heat-accumulators contain accumulating agents having melting temperatures higher than the temperature of the second partial flow of gas, e.g., cool night air. Agents of different melting points may be used if the night temperatures change in the course of the year.

An embodiment of a plant according to the present invention is shown in the drawings and will be further described hereinafter.

The plant according to the embodiment of the invention shown in FIGS. 1 and 2 comprises a fan (1), several solar energy collectors (2), several absorber beds (3) which are filled with a water-absorbing agent, one or more regenerative heat-accumulators (4) which are connected in series and filled with suitable heat-accumulating agents, and an additional fan (5).

During the phase of absorption (FIG. 1) the fan (1) sucks in a water-vapor-containing air flow (6) from the cool night air. The air flow (6) is divided into two partial flows (6a) and (6b), the partial flow (6a) is conducted to the absorber beds (3) which are connected in parallel or in series during the phase of absorption. The partial flow (6a) passes through the absorber beds (3) whereby the water-absorbing agent contained in the absorber beds (3) is moistened with the water-vapor contained in the partial flow (6a). The second partial flow (6b) is conveyed by the fan (1) through the heat-accumulators (4) which are connected in series, whereby the accumulating agents contained in the heat-accumulators (4) cool down or solidify. After having passes through the heat-accumulators (4) the partial flow (6b) is discharged into the atmosphere by the fan (5). The direction of the flow of the two partial flows (6a) and (6b) is indicated by the arrows (12). The partial flow (6a) is discharged into the atmosphere after having passed through the absorber beds (3).

During the day the plant according to the invention is operated for the desorption of the water absorbed by the water-absorbing agent (FIG. 2). The fan (1) accelerates an air flow (7) which circulates in the plant. The direction of flow of the air flow (7) circulating in the plant is indicated by the arrows (11).

After having left the fan (1), the air flow (7) passes through the first one of the solar energy collectors (2), which convert solar energy into heat and supply it to the air flow (7). The heated air flow (7) subsequently passes through the first absorber bed (3) and then alternatingly through the additional solar energy collectors (2) and the additional absorber beds (3), which are connected with the solar energy collectors (2) in alternating sequence. Thereby the air flow (7) extracts the water absorbed by the water-absorbing agent and is reheated by the solar energy collectors (2) positioned between the absorber bed (3). Subsequent to leaving the last absorber bed (3) the heated air flow (7) enriched with water-vapor is conveyed by the fan (5) through the regenerative heat-accumulator (4) connected in series, whereby the accumulating agents in the regenerative heat-accumulators (4) are heated or liquidized, and the water-vapor in the air flow (7) condenses on the heat-exchanging surfaces of the heat-accumulators (4). The water, which has condensed on the heat-exchanging surfaces of the heat accumulators (4), is collected and drained off in the direction of arrow (8). Subsequent to passing through the last heat-accumulator (4), the air flow re-enters the fan (1) and the cycle starts afresh. Owing to the continuous circulation of the air flow (7) in the plant according to the invention nearly the total amount of water absorbed by the water-absorbing agent is extracted from the water-absorbing agent and conveyed into the heat-accumulators (4) so that the loss of water is extremely small.

The number of absorber beds, solar energy collectors, and regenerative heat-accumulators, is dependent upon the atmospheric and climatic conditions at the place of use of the plant according to the present invention and upon the absorbing agent used. Silica gel, for example, is suited for use an an absorbing agent.

The intensity of the air flow (7) circulating in the plant during the phase of desorption and the intensity of the air flow (6) passing through the plant during the phase of absorption and refrigeration may be regulated by the fans (1) and (5).

The plant according to the invention may be equipped with air filters which prevent entry of dust into the plant. Furthermore, the plant may comprise troughs in which the condensed water formed in the heat-accumulators (4) is collected. The collected water may be treated with suitable minerals so that it is available as drinking water.

Instead of solar energy collectors (2) the plant according to the present invention may be equipped with a combination of heat-exchangers and solar energy collectors connected therewith, the heat-exchangers replacing the former solar energy collectors (2) and procuring the heat from the solar energy collectors connected therewith.

The gas conduit means may further comprise means for directing the flow of gas in the desired manner, e.g., valves which may be adjusted to allow the flow of gas to circulate through the plant passing in series through all the parts thereof or to allow the flow a partial flow of gas in series through the heat-accumulators and another partial flow of gas either in series or in parallel through the absorber beds with or without also passing through the solar energy collectors.

What is claimed is:

1. A process for recovering water from moist gas which comprises a first reaction stage, which comprises the steps of:
   (a) dividing a first flow of the moist gas into a first partial flow of gas and a second partial flow of gas;
   (b) passing the first partial flow of gas through at least one absorber bed of a water-separating apparatus containing an absorbing agent, whereby moisture from the moist gas is absorbed by the absorbing agent and a moisture-containing absorber bed and an at least partially dried first partial flow of gas are obtained;
   (c) discharging the at least partially dried first partial flow of gas from the water-separating apparatus;
   (d) passing the second partial flow of gas through at least one heat-accumulator of the water-separating apparatus, whereby heat is transferred from the heat-accumulator to the second partial flow of gas and a de-heated heat-accumulator and a heated second partial flow of gas are obtained; and
   (e) discharging the heated second partial flow of gas from the water-separating apparatus;
   and a second reaction stage, which comprises the steps of:
   (a') passing a second flow of the moist gas through at least one unit of the water-separating apparatus comprising a solar energy collector and the moisture-containing absorber bed, whereby the second gas flow is heated by heat-transfer from the solar energy collector to obtain a heated second gas flow and subsequently moisture is absorbed from the moisture-containing absorber bed and a heated second gas flow of increased moisture-content is obtained;
   (b') subsequently passing the heated moisture-containing second gas flow through the deheated heat-accumulator, whereby heat is transferred to the heat-accumulator, and water is condensed on the accumulator surfaces and a second gas flow of decreased moisture-content and decreased temperature is obtained;
   (c') discharging the second gas flow obtained in step (b') from the water-separating apparatus; and
   (d') collecting the condensed water from the accumulator surfaces.

2. The process as defined in claim 1, wherein the temperature of the first flow of gas is lower than that of the second flow of gas.

3. The process as defined in claim 1, wherein the first reaction stage is carried out during nighttime and the first flow of gas comprises cool night air, and the second reaction stage is carried out during daytime.

4. The process as defined in claim 1 wherein in the first reaction stage the first partial flow of gas passes through at least two absorber beds in series or in parallel and the second partial flow of gas passes through at least two heat-accumulators in series, and in the second reaction stage the second flow of gas passes in series through an alternating sequence of at least two solar energy collectors and at least two absorber beds, and then passes through at least two heat-accumulators in series.

5. The process as defined in claim 1 wherein the second reaction stage comprises the steps of repeatedly recycling the gas flow obtained in step (b') back into step (a') prior to discharging it from the water-separating apparatus.

6. An apparatus for carrying out the process as defined in claim 1, which comprises a gas inlet, at least one fan, at least one solar energy collector, at least one absorber bed adapted to receive a water-absorbing agent, at least one heat-accumulator, a gas outlet, and conduit means connecting the gas inlet, the fan, the solar energy collector, the absorber bed, the gas outlet, and the heat-accumulator in such a manner, that during a first reaction stage the flow entering through the gas inlet is passed through the fan, divided into a first and a second partial gas flow, the first partial gas flow is conducted through the absorber bed to the first gas outlet and the second partial gas flow in conducted through the heat-accumulator to the first gas outlet and in a second reaction stage a gas flow is passed from the gas inlet through the fan, then is circulated in series through the solar energy collector, the absorber bed, and the heat-accumulator back to the fan.

7. The apparatus as defined in claim 6 which comprises at least two said solar energy collectors and at least two said absorber beds which are connected by said conduit means in such a manner that in the first reaction stage the first partial gas flow is passed through the absorber beds in parallel or in series, and in the second reaction stage the gas flow is passed through the solar energy collectors and the absorber beds in series alternatingly passing through one of the solar energy collectors and then one of the absorber beds.

8. The apparatus as defined in claim 6 which comprises at least two heat-accumulators which are connected by said conduit means in such a manner that in the first and the second reaction stage the gas flow is passed through the heat-accumulators in series.

9. The apparatus as defined in claim 6 wherein the heat accumulator comprises a heat-exchange agent having a melting point higher than the temperature of the second partial flow of gas.

* * * * *